United States Patent
Lindberg et al.

(10) Patent No.: US 8,938,779 B2
(45) Date of Patent: Jan. 20, 2015

(54) SECURE DIGITAL COMMUNICATIONS

(71) Applicant: DTS Steering Group AB, Malmo (SE)

(72) Inventors: Niclas Lindberg, Ahus (SE); Anders Orre, Glumslöv (SE); Ilio Virgili, Veberöd (SE)

(73) Assignee: DTS Steering Group AB, Malmo (SE)

( * ) Notice: Subject to any disclaimer, the term of this patent is extended or adjusted under 35 U.S.C. 154(b) by 0 days.

(21) Appl. No.: 14/202,508

(22) Filed: Mar. 10, 2014

(65) Prior Publication Data

US 2014/0196107 A1    Jul. 10, 2014

Related U.S. Application Data

(63) Continuation of application No. PCT/SE2011/051084, filed on Sep. 8, 2011.

(51) Int. Cl.
*H04L 29/06*   (2006.01)
*G06Q 20/40*   (2012.01)
*H04L 9/32*    (2006.01)

(52) U.S. Cl.
CPC .............. *H04L 63/00* (2013.01); *G06Q 20/405* (2013.01); *H04L 9/3247* (2013.01); *H04L 63/20* (2013.01)
USPC .......................................................... 726/1

(58) Field of Classification Search
None
See application file for complete search history.

(56) References Cited

U.S. PATENT DOCUMENTS

| | | | | |
|---|---|---|---|---|
| 8,578,411 | B1 * | 11/2013 | Carney et al. | 725/37 |
| 8,607,357 | B2 * | 12/2013 | Dewa | 726/27 |
| 8,615,520 | B2 * | 12/2013 | Fallah | 707/755 |
| 2002/0016777 | A1 * | 2/2002 | Seamons et al. | 705/76 |
| 2004/0073797 | A1 * | 4/2004 | Fascenda | 713/171 |
| 2010/0077454 | A1 | 3/2010 | Xiao et al. | |

FOREIGN PATENT DOCUMENTS

| | | | | |
|---|---|---|---|---|
| EP | 0 969 430 A1 | 1/2000 | | |
| EP | 2128781 A1 * | 12/2009 | | G06F 21/00 |
| WO | 2007/068098 A1 | 6/2007 | | |
| WO | WO 2010033081 A2 * | 3/2010 | | H04L 9/32 |
| WO | 2011/081589 A1 | 7/2011 | | |

OTHER PUBLICATIONS

International Search Report mailed Jun. 25, 2012; PCT/SE2011/051084.

* cited by examiner

*Primary Examiner* — Michael R Vaughan
*Assistant Examiner* — Richard McCoy
(74) *Attorney, Agent, or Firm* — Ladas & Parry LLP

(57) ABSTRACT

Policies are used when performing a transaction between a first and a second device, the first device having an established trusted communication relation with a first trusted device and the second device having an established trusted communication relation with a second trusted device, and the first and the second trusted device each having an established trusted communication relation with a third trusted device. A policy defines a set of constructs for creating rules to control the boundaries of a transaction. The policy defines role definition stipulating what interacting identities must have been validated as for the transaction to occur. The policy also defines a set of digest method algorithms or data referral methods to be used in the transaction.

18 Claims, 2 Drawing Sheets

SECURE DIGITAL COMMUNICATIONS

TECHNICAL FIELD

The present invention relates to methods for digital communications systems.

BACKGROUND

The Internet has revolutionized the way business is done and has changed consumer behavior in a very short space of time. However, electronic commerce will only be able to realize its full potential if a number of important conditions are met, one important condition being that the communication between digital systems is secure.

It is of importance that information does not fall into the wrong hands, such as in the hands of an unauthorized party, or is tampered with by a participating party or by a third unauthorized party. It is also of importance that communications devices can trust each other.

SUMMARY

In view of the above, it would be desirable to achieve an improved method for digital communication and, in particular, an improved method for digital communication in terms of improved authentication and traceability.

According to one aspect illustrated herein, there is provided a method of performing a transaction between a first device and a second device, the first device having an established trusted communication relation with a first trusted device and the second device having an established trusted communication relation with a second trusted device, the first and the second trusted device each having an established trusted communication relation with a third trusted device, the method comprising the steps of a) the first device selecting, from a set of policies known to the devices, a policy for the transaction, wherein the selected policy comprises a first role definition comprising form and content of first input data, if any, to be provided by the first device, and form and content of first reference data, if any, pertaining to the first device and which is to be provided by the first trusted device, a second role definition comprising form and content of second input data, if any, to be provided by the second device to the first device, and form and content of second reference data, if any, pertaining to the second device and which is to be provided by the second trusted device to the first device, a referral method definition pertaining to at least one referral method to be used by the devices for processing respective input data and reference data, b) the second device receiving an invitation message comprising information indicating the selected policy, c) the second device accessing the selected policy to obtain the first and second role definition and the referral method definition, d) the second device processing the second input data according to the referral method to form a second representative value, and the first device processing the first input data according to the referral method to form a first representative value, e) the first trusted device receiving, from the first device, the first representative value, and the second trusted device receiving, from the second device, the second representative value, f) the first trusted device confirming the originality of the first device, processing the first reference information according to the referral method, validating that the first input data is according to the policy and including the first representative value to form a first referenced representative value, g) the second trusted device confirming the originality of the second device, processing the second reference information according to the referral method, validating that the second input data is according to the policy and including the second representative value to form a second referenced representative value, h) the third trusted device receiving the first referenced representative value from the first trusted device, and the second referenced representative value from the second trusted device, i) the third trusted device validating first and second referenced representative value against the policy, j) the first trusted device and the second trusted device receiving, from the third trusted device, a transaction receipt comprising the first and second referenced representative value, k) the first trusted device validating the second referenced representative value in the received transaction receipt against the second role definition, and the second trusted device validating the first referenced representative value in the received transaction receipt against the first role definition.

By using methods according to the present invention many important advantages may be achieved, such as:

1. Digital identities may be allowed to evolve as real life identities.

2. Digital interactions are able to support the real life legal properties of a role with respect to Intellectual Property Rights (IPR).

3. Digital interactions may now be witnessed by a third party to support digital traceability.

The above described and other features are exemplified by the following figures and detailed description.

BRIEF DESCRIPTION OF THE DRAWINGS

Embodiments of the present invention will now be described in more detail, reference being made to the enclosed drawings, in which.

DETAILED DESCRIPTION OF EMBODIMENTS OF THE INVENTION

Embodiments of the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Furthermore, like numbers refer to like elements throughout.

Throughout the description, use of the terms sending or receiving does not imply a direct peer to peer transmission between two entities, nodes or devices. In the present invention, the transmission may be either direct or involve any number of entities participating in the transfer between the final recipient of information, and the original sender of the information.

Further, it may be noted that throughout the description when an item, a message, information or data is sent or received, this may also mean that only a digest or a reference to the item, message, information or data is sent or received, not the actual item, message, information or data itself. However, in most cases a direct reference to a specific item, message, information or data is used in the text, in order to simplify the description for a reader.

Figure 1:
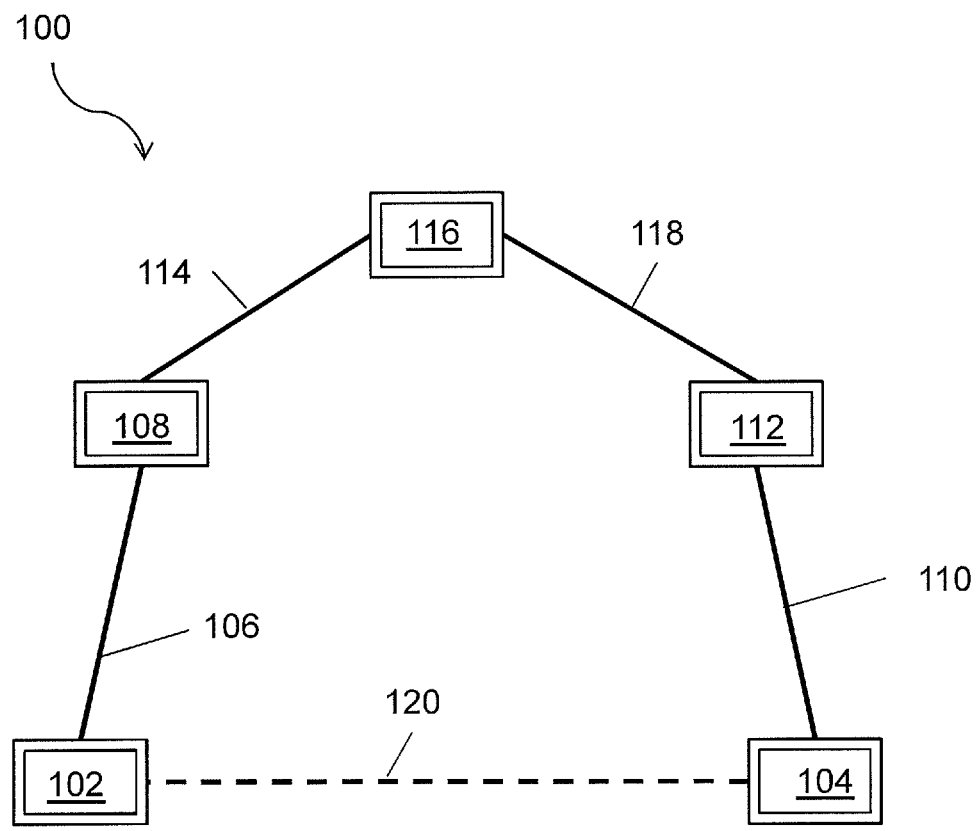
FIG. 1 schematically shows a communication system where a method of performing a transaction may be used.

FIG. 1 shows a schematic diagram of an exemplary communications system 100 in which the disclosed embodiments may be applied. The communications system 100 comprises a number of devices 102, 104, 108, 112, 116 which may or may not be able to communicate with each other. The devices 102, 104, 108, 112, 116 may e.g. take the form of mobile communications devices, such as mobile phones or portable digital assistants (PDA), or stationary (desktop) computers or portable (laptop) computers.

A method in which a first device 102, wishes to establish a connection with a second communication device 104, will be described below.

The first device has an established trusted communication relation 106 with a first witness device, also called first trusted device 108. The second device has an established trusted communication relation 110 with a second trusted or witness device 112. The first trusted device also has an established trusted communication relation 114 with a transaction witness device or fourth trusted device 116 and the second trusted device 112 has an established trusted communication relation 118 with the same fourth trusted device 116. The term "established trusted communication relation" implies that devices having such a relation know and trust each other in a digital sense, for example that they have accepted each other's public signature keys. The establishment of any such a relation might take place according to methods described herein.

In FIG. 1 solid lines 106, 110, 114, 118 between two devices 102, 104, 108, 112, 116 represents that communication has previously been established between the two communication devices at each end of the solid line 106, 110, 114, 118. As indicated by a dashed line 120 communications is to be established between the first device 102 and the second device 104.

The function of the first trusted device or witness device 108 in relation to the first device is to enable the first device 102 to act in a digital transaction. Transactions are further elaborated below. The first witness device 108 vouches for the identity of the first device 102. The first witness device 108 also performs the function of ensuring that transactions performed by the first device 102 confirm to a given policy for the transaction. Policies are discussed further below. In addition, the first trusted device 108 may also reassure the identity of the first device 102 within future transaction boundaries, i.e. in a future execution of a relation established through a transaction. The second trusted device 112 has the corresponding function in relation to the second device 104.

The first, second and fourth trusted device are part of the same witness network, or network of trusted devices, which means that the first trusted device 108 and the second trusted device 112 may also have an established communication relation. Since this relation is irrelevant for the method for establishing a communication relation as described below, this is not indicated in FIG. 1. Devices within one and the same witness network know and trust each other in a digital sense, which for example mean that they are aware of each other's digital signatures. A witness network may for instance be hosted by a mobile operator. It may also be noted that it is not necessary for the first, second and fourth trusted device to be different devices, one and the same trusted device may act or serve as or perform the functions of one or more of the other trusted devices or witness devices.

Figure 2:
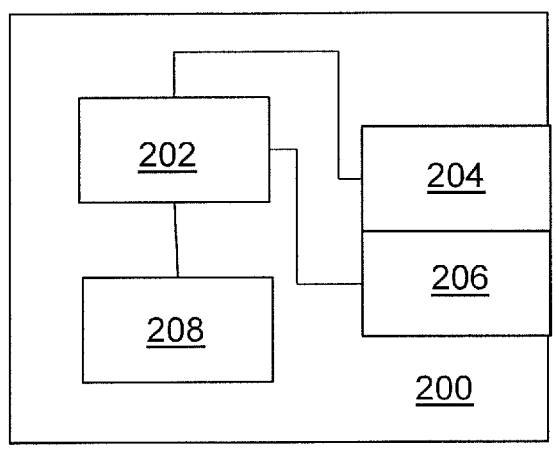
FIG. 2 illustrates a device which may be used in a transaction.

FIG. 2 is a schematic diagram of internal components of a device 200 corresponding to the devices 102, 104, 108, 112, 116 of FIG. 1 according to embodiments. The device 200 comprises an evaluating functional block 202, which may comprise a processing unit. The evaluating functional block 202 is arranged to be operatively connected to a data receiving functional block 204, a data sending functional block 206, a data storage functional block 208.

The data receiving functional block 204 is configured to receive data signals from external units, devices, and apparatuses. The data sending functional block 206 is configured to send data signals to external units, devices, and apparatuses. The data receiving functional block 204 and the data sending functional block 206 may be part of a common transceiver functional block configured to both receive and send data. The memory data storage functional block 208 may be configured to store computer program instructions pertaining to a computer-implemented method for authentication of a device and for performing transaction between devices such as when establishing communication or when exchanging or transferring information between devices. The memory data storage functional block 208 may thus form a computer-readable medium which may have stored thereon software instructions. The software instructions may cause the evaluating functional block 202 to execute a method according to embodiments of the present invention.

Methods in which a first device 102, wishes to establish a connection with a second device 104, will be described below. The below described methods may be implemented as one or more computer program products. The computer program product may comprise computer program code stored on a computer-readable storage medium, such as the data storage functional block 208. The computer-readable storage medium may thus be a computer memory, a computer-readable disc or the like. The computer-readable storage medium may be a computer chip. The computer chip may be an ASIC or an FPGA. The computer-readable storage medium may load executable program portions to the communication devices 102, 104, 108, 112, 116. When executed on a processor, such as by the evaluating functional block 202, of the communication devices 102, 104, 108, 112, 116, the computer program product thus carries out the disclosed methods.

Communication or exchange of information between devices taking place according to embodiments of the present invention are called transactions. Transactions may be used for an infinite number of purposes, and the examples described herein shall be understood as being just examples, and should not in any way be understood as limiting the use of transactions. Transactions are hosted by a transaction witness, in FIG. 1 this is the fourth trusted device 116.

A transaction does not have to be started on the initiative of a participating device. A transaction witness may for example start a transaction by sending invitations to devices, or a witness device not participating in the transaction may initiate a transaction between two or more other devices. A transaction may be initiated when a need arises at a device of interaction between two or more devices, or a transaction may be initiated according to a predefined time schedule or triggered by an event. As an example, the first and second device, as well as the transaction witness, may run on a common time schedule so that both the first and the second device at a certain time provides certain input data, via the first and second trusted device, to the transaction witness without any invitations being sent. The transaction witness may then, as an example, perform or not perform an action based on the content received in the input data. Another example is when a device sends its input data with a request for a transaction to be created to a witness device without previous knowledge of any transaction ID or host for the transaction. The witness receiving the input data will then create the transaction on reception of the input data and send out invitations to other parties needed for the transaction to take place. The choice of policy may be done by the device sending the input data or by the witness device creating the transaction.

Each transaction is governed by a policy suited to the purpose of the specific transaction. The policy may be described as a set of rules for the transaction. In a witness network, a number of policies are predefined and maintained by the witness network for use in transactions in that witness network. Policies may also be shared between several witness networks. A device may for example obtain information on a suitable policy for the transaction it needs to perform by its corresponding trusted device or witness providing a reference to a suitable policy.

A policy contains role definitions for devices participating in transactions. The role definition defines the originality of a role. As an example, for the role "tax payer", the witness ensures (or confirms) that the device acting in the "tax payer" role represents a validated tax payer in order to participate in the transaction. The policy containing the role definition specifies the form and content of any input data required by devices acting in the defined role as well as optional reference data to be provided regarding the devices acting in the role.

If reference data is specified in a policy, this is provided by a witness or trusted device with which a certain device acting in a role has an established communication relation. In FIG. 1 the first trusted device 108 may provide reference data about the first device 102 and the second trusted device 112 may provide reference data about the second device 104.

The reference data is provided as confirmation that a witness device has validated the originality of input data received from a device, i.e. that the witness or trusted device has checked that the input data was received from the correct device. This may be done by comparing a digital signature of the input data with a digital signature received from that device when the relation was established between the device and the trusted device.

Optionally, the policy may not state any requirement for the reference data. However, the respective witness device will still validate the originality of the input data received. That the witness device is willing to pass on the input data or in other manner continue the transaction is then seen as an implicit confirmation that the originality of the input data has been validated by the witness device.

The reference data may be of several different types. An example of reference data is a digital signature of the witness device. The signature is added to the input data when the witness device has validated the originality of the input data and confirms that this validation has taken place. Another example of a reference is a personal ID card, a passport number or a social security number.

The policy also contains definitions of data referral methods to be used by the participating devices to process the input data and reference data. The policy will list at least one data referral method. However, it may be noted that the data referral method listed may be "use data in original form to reference data", i.e. it is not necessarily so that any processing needs to take place to reference the data using the data referral method.

Examples of data referring methods are hash or digest methods, which when used by a device to process a data item creates a more or less unique representation of that data item. The uniqueness of a digest or hash value depends on the complexity of the hash method. Hash methods are known per se and will not be further elaborated herein. Other examples of data referral methods are methods that produce a known MIME-type definition or the length of the input data. Any existing and future algorithm or method used for the general purpose of providing a way of representing data may be called a data referral method.

Assuming that the first device 102 now wishes interact with the second device, in this example with the purpose of establishing a communication with, or, in other words, authenticating, the second device 104, as indicated by the dashed line 120 in FIG. 1, the first device 102 starts by sending a request to the transaction witness device, or fourth trusted device 116, via the first trusted device 108, to create a transaction. In the request the first device 102 refers to the policy to be used for the transaction. In this example the policy would pertain to establishing communication between two devices not previously having an established communication, i.e. to authenticate a second device to a first device and vice versa. The input data required from the first device 102 is information pertaining to securely communicating with the first device and the input data required from the second device is information pertaining to securely communicating with the second device. Example of such information would be a signature public key of the respective device.

The reference information regarding the first device is a signature public key of the first trusted device and the reference information regarding the second device is a signature public key of the second trusted device. In case the first device wishes to establish a secure communication with encryption possibilities with the second device, the input data required from the first device could also contain an encryption public key of the first device and the input data required from the second device an encryption public key of the second device.

On receipt of the request the transaction witness device 116 creates a transaction ID unique to device 116. The transaction ID is used to identify the transaction instance locally at device or node 116. The transaction witness device 116 hosts the instance and data arriving in the transaction from the device 108 and the device 112 until the transaction is completed.

The first device 102 receives the transaction ID via the first trusted device 108. The first device 102 then creates invitations for those devices that are to be part of the transaction, in this case it would be the first device 102 itself and the second device 104, and sends the invitation to the invited devices. If the invitation is sent directly from the first device 102 to the second device 104 it may be sent as clear text. The invitation may also be sent via the first trusted device 108 and the second trusted device 112 to enable secure (if such communication exists between the involved devices) transportation of the invitation.

Each invitation comprises a reference to the policy, the transaction ID and its host and an indication to the invited device regarding the role definition in the policy that it should use or act in if it decides to participate in the transaction.

When the invitation messages have been received at the first and second devices, they each provide the input data as specified in their role in the policy. If the second device does not have information on the policy in itself, it may contact the second trusted device, which, as being part of the same witness network as the first trusted device, will have information on all policies maintained in that witness network. In the exemplified case of establishing a new trusted communication relation the input data required in the role definition in the policy used by the first device is a signature public key of the first device, and the input data required in the role definition in the policy used by the second device is a signature public key of the second device.

The first and second device also process or digest the input data required by them according to one or more data referral methods, if any such methods are specified in the policy.

The invited devices sign their input data (now in possibly digested form) by respective signature public keys which were used when they established their trusted communication relations with their witness (trusted device) and send their input data to their witness, also including information on the transaction ID and policy. To summarize, the data that is signed and sent by the invited devices to their respective witness devices is:
- a reference to the policy used for the transaction
- a reference to the role in the policy that the invited devices acts in for the transaction
- the required input data, in the form required by the policy, i.e. processed according to the data referral method(s) or digest method(s)
- the requirements from each invited and participating device on other devices' input data and reference data
- information on the transaction witness device or node hosting the transaction as well as the relevant transaction ID.
- archiving information for the sending device, if such archiving information has been requested in the policy When the first trusted device receives the input data from the first device it will validate the originality of the input data, i.e. the first device will check that the input data was really received from the first device acting in the role defined by the policy, for example by checking that the signature used to sign the input data is the same as the signature obtained from the first device during the establishment of the trusted communication relation between the first trusted device and the first device and that the first device has been authenticated in the role it is acting in. A corresponding procedure for validating the originality of the second input data will take place in the second trusted device.

When the witnesses, i.e. first and second trusted device, have confirmed the originality of the device sending the input data that they received, they will add any reference information that they are required to provide according to the definitions in the used policy. As noted above, in the exemplified case this is a signature public key of the witness. The witnesses will process their respective reference data according to the same referral methods specified in the policy. Then the witnesses will sign their respective input data, timestamp the added reference information and the role of the participating device, by a signature public key used when they were establishing their respective trusted communication relation with the fourth device and send their respective input data to the transaction witness in the form of the fourth trusted device 116 including a specification of the transaction ID at the fourth trusted device. The fourth trusted device (the transaction witness device or node) will then use the transaction ID to find the correct instance of the transaction.

The fourth trusted device then compiles the received input data from the first and second trusted device into a receipt message and the first device receives this message via the first trusted device and the second device via the second trusted device. In the exemplified case where the input data included the signature keys of the first and the second device as well as the reference information in the form of signature keys of the witnesses, the first and second devices now hold each other's signature public keys and the signature keys of each other's witnesses. This means that a trusted communication relation has been established between the first and second device, which is "witnessed" by first and second trusted device by their signature keys being included.

Going more into detail regarding the transfer of the receipt message from the fourth trusted device to the first and second device, this process may also comprise the following steps further enhancing the traceability and reducing the risk of tampering:

When receiving the receipt message the first trusted device may send the first receipt message to a first trusted device archive associated with the first trusted device. Additionally or alternatively the first trusted device may send the first receipt message to a first device archive associated with the first device. Alternatively the first trusted device may forward the first receipt message to the first device to archive. By archiving the receipt message it is ensured that any future disputes regarding the validity and timing of a transaction may be resolved. The archive/s used (the first trusted device archive and/or the first device archive) may upon receipt of the first receipt message send an archiving complete message to the first trusted device, thus confirming that the archiving has been performed. The device/s receiving an archiving complete message may in turn validate that the archiving complete message was sent by the correct archive.

The completion of the archiving of the receipt message may be confirmed to the fourth trusted device by the first trusted device sending to the fourth trusted device a first confirmation message indicating that the first receipt message was received by the first trusted device. A corresponding archiving process may take place in relation to the second trusted device.

When the fourth trusted device has received confirmation that the archiving is completed it may issue a confirmation complete message to the first and second trusted device. The first and second trusted device may use this message as an indication that the transaction has been successfully completed and send the receipt message on to the first and second device only when this confirmation complete message has been received.

Figure 3:
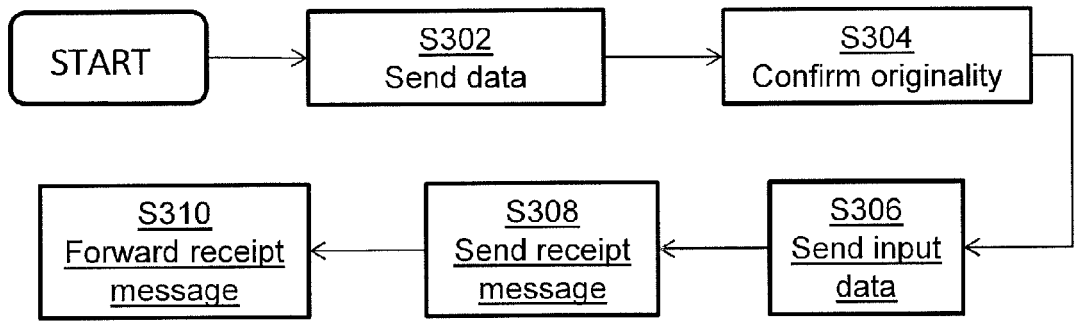
FIG. 3 illustrates a method of performing a transaction.

In its most general form a transaction may be described as follows with reference to FIG. 3:

A prerequisite for a transaction is that the first device has an established trusted communication relation with a first trusted device and the second device has an established trusted communication relation with a second trusted device. Further, the first and the second trusted device each have an established trusted communication relation with a fourth trusted device.

In first step, S302, the first device sends first input data to the first trusted device and the second device sends second input data to the second trusted device.

In a second step S304, upon receipt of the first input data from the first device the first trusted device confirms the originality of the first device and then, in a third step, S306, sends the first input data to the fourth trusted device. Correspondingly, upon receipt of the second input data from the second device, the second trusted device in step S304 confirms the originality of the second device and in step S306 sends the second input data to the fourth trusted device.

In step S308 the fourth trusted device sends a first receipt message to the first trusted device and a second receipt message to the second trusted device. Both of these receipt messages comprises the first and the second input data.

In step S310 the first trusted device then forwards the first receipt message to the first device and the second trusted device forwards the second receipt message to the second device.

It may be noted that both the first and the second trusted device may confirm to the fourth trusted device that they have received the transaction receipts, and on receipt of these confirmations, the fourth trusted device may issue a transaction result confirmation to the first and the second trusted device indicating that the transaction is now complete.

Figure 4:
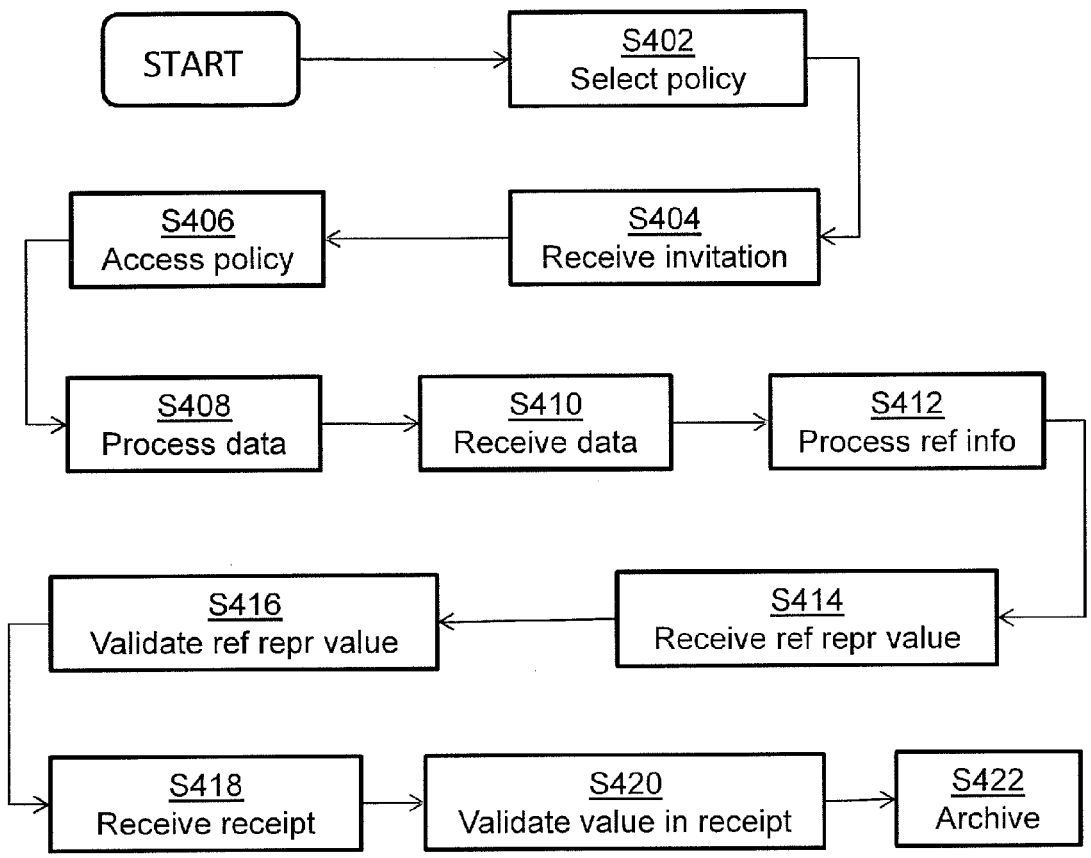
FIG. 4 illustrates in more detail a method of performing a transaction.

A method of performing a transaction between a first device and a second device may also be described with reference to FIG. 4, with the prerequisites that the first device has an established trusted communication relation with a first trusted device and the second device has an established trusted communication relation with a second trusted device, and that the first and the second trusted device each have an established trusted communication relation with a third trusted device.

a) In step S402 the first device selects, from a set of policies known to the devices, a policy for the transaction, wherein the selected policy comprises
   a first role definition comprising
      form and content of first input data, if any to be provided by the first device, and
      form and content of first reference data, if any pertaining to the first device and which is to be provided by the first trusted device,
   a second role definition comprising
      form and content of second input data, if any to be provided by the second device to the first device, and
      form and content of second reference data, if any pertaining to the second device and which is to be provided by the second trusted device to the first device,
   a referral method definition pertaining to at least one referral method to be used by the devices for processing respective input data and reference data, b) In step S404 the second device receives an invitation message comprising information indicating the selected policy, c) In step S406 the second device accesses the selected policy to obtain the roles definition and the referral method definition, d) In step S408 the second device processes the second input data according to the referral method to form a second representative value, and the first device processes the first input data according to the referral method to form a first representative value, e) In step S410 the first trusted device receives, from the first device, the first representative value, and the second trusted device receives, from the second device, the second representative value, f) In step S412 the first trusted device confirms the originality of the first device, processes the first reference information according to the referral method, validating that the first input data is according to the policy and includes the first representative value to form a first referenced representative value, g) In the same step S412 the second trusted device processes the second reference information according to the referral method, and includes the second representative value to form a second referenced representative value, h) In step S414 the third trusted device receives the first referenced representative value from the first trusted device, and the second referenced representative value from the second trusted device, i) In step S416 the third trusted device validates the first and second referenced representative value against the policy, j) In step S418 the first and the second trusted device receive, from the third trusted device, a transaction receipt comprising the first and second referenced representative value, k) In step S420 the first trusted device validates the second referenced representative value in the received transaction receipt against the second role definition and the second trusted device validates the first referenced representative value in the received transaction receipt against the first role definition.

In an optional step S422, the first trusted device sends the transaction receipt to one or more archives, which may be either an archive associated with the first trusted device or an archive associated with the first device. Alternatively the first trusted device may forward the first receipt message to the first device to archive. Correspondingly, the second trusted device sends the transaction receipt to one or more archives, which may be either an archive associated with the second trusted device or an archive associated with the second device, or the second trusted device forwards the receipt to the second device for archiving.

To further understand the usefulness of embodiments of the present invention, some available solutions for secure communication will now be described and compared to the solutions described herein.

In current solutions, used on the internet, such as Public Key Infrastructure (PKI) and Certificate Authorities (CA) there is a lack of constructs defining boundaries of an interaction between one or more parties. Current solutions are targeting the validity of a signature and not at all in which context that signature is being used.

The concept of policy introduced herein adds an additional layer of controlling interaction:

1) The reference of the policy is always included within the signature binding the signature to the boundaries of its usage.

2) The policy enables identities to further restrict the boundaries of its usage i.e. the identity knowing that its signature can not be used out of scope. As an example, identity pre-signing may be used with the condition that the signature is valid if an only of the other party in the transaction is associated with a specific ID number, passport number or social security number.

The policy construct is a perpendicular construct in addition to digital signatures. The policy is governed by a third party (witness) dictating the rules of interaction for identities which map to real world operation of organizations, governmental functions etc, which all interacting parties need to follow.

To summarize, the rules of a policy decides:

1) In what legal roles must the interacting role be validated as.

2) What input data must an interacting role contribute with.

3) What reference data must an interacting role's trusted device contribute with for the role.

4) What referral methods (digest algorithms) must be used by the interacting parties.

5) The possibility for an interacting role to delegate its interaction.

6) The possibility for an interacting role to get a copy of the complete result of a transaction.

7) Further more the policy may control:

A set of restrictions which provide data that adhere to e.g. reference data for roleX's country code must be equals to "USA".

Interaction order of identities within a transaction.

In some embodiments of the invention digital delegation instructions may be used for delegating possibilities of interaction to other nodes, devices, identities or entities. This concept is not supported current solutions. The delegation rights are specified in the policy used for a transaction.

To further explain this concept, assume that the second device wants to delegate a right to the first device to exchange information or in other manner interact with a third device on behalf of the second device. The digital delegation instruction contains the compound keys of the third device and the compound keys of the first device and/or reference data of the first device to prove itself as in a new relation with the third device, and is registered at the trusted node of the second device, i.e. the second trusted device or second witness device. Whenever the digital delegation instruction is being used its validity is confirmed by the second trusted device and the second device may at any time cancel the digital delegation instruction by informing its witness (the second trusted device) not to sign it as valid for future requests.

As described above, the transaction taking place according to embodiments of the present invention are governed by policies. Going more into detail, a policy defines a set of constructs for creating rules to control the boundaries of a transaction. To create a policy at least two parts are used, the first being a role document which is a document describing the legal meaning of a role. This could for instance be "nurse" or "CEO", when a device that takes part in a transaction represents that role. The second part is a content type document, which is a document describing the format type of data, which e.g. is MP3, "drivers licenses","invoice", all depending on the type of transaction. Further, as mentioned above, to create a policy a set of digest method algorithms or data referral methods are defined. The digest methods defined in policy will be used throughout the transaction for all content exchanged.

To summarize, the policy defines:

The required roles of the identities to act in a transaction. The policy also defines the maximum and minimum boundaries of identities in each role.

The data that each role has to contribute in the transaction. The data may be restricted by a set of values such as "Yes" or "No" or unrestricted to accept any value for the data.

The reference data that a trusted node or device (witness), in the trusted network, will add for an identity in a role. The reference data may be restricted by a set of values such as "Yes" or "No" or unrestricted to accept any value of the reference data.

The network where the policy is to be executed.

The archiving permission for each role, i.e. which devices are allowed to archive the transaction receipt message The permission for an act to be delegated or not for each role It may be noted that to create a transaction according to embodiments of the present invention a policy and a transaction configuration defining the number of identities to interact for each role in the transaction are used. As described above, when a transaction has been created identities (in the form of the first and second device) are invited to sign in the transaction. Each trusted node or device (witness), in the trusted network, will validate that the identity is validated as the legal role in which the identity is trying to sign in the policy. The trusted device further adds the reference data for the specific identity and waits for other identities to complete the transaction. Wen all devices have completed the transaction, a transaction receipt is distributed to each trusted device and, if the policy that was used allows, to the archive(s) of choice of the identity.

When a device participates in a transaction according to a selected policy reference conditions on another device in a transaction may be defined. By using reference conditions a transaction is rendered void if the other device in the transaction does not live up to the reference requirement defined by a participating device. One example is that a device may use a condition that it will only participate in a transaction if and only if reference information regarding the other device is provided which ensures that the other device represents a certain entity. In simple terms: "I am signing in transaction if, and only if, the counterpart turns out to be PersonX". This information is provided along with the input data.

The concept of policies adds security and controllability of transactions in a way that was not possible using the previous solutions, for example of a PKI structure.

To summarize, policies are used when performing a transaction between a first and a second device, the first device having an established trusted communication relation with a first trusted device and the second device having an established trusted communication relation with a second trusted device, and the first and the second trusted device each having an established trusted communication relation with a third trusted device. A policy defines a set of constructs for creating rules to control the boundaries of a transaction. The policy defines role definition stipulating what interacting identities must have been validated as for the transaction to occur. The policy also defines a set of digest method algorithms or data referral methods to be used in the transaction.

It is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a device" or "the device" may include several devices, and the like. Furthermore, the word "comprising" does not exclude other elements or steps.

The invention claimed is:

1. A method of performing a transaction between a first device and a second device, the first device having an established trusted communication relation with a first trusted device and the second device having an established trusted communication relation with a second trusted device, the first trusted device and the second trusted device each having an established trusted communication relation with a third trusted device, comprising the steps of:

a) the first device selecting, from a set of policies known to the devices, a policy for the transaction, wherein the selected policy comprises a first role definition comprising:

form and content of first input data, if any, to be provided by the first device, and form and content of first reference data, if any, pertaining to the first device and which is to be provided by the first trusted device, a second role definition comprising
form and content of second input data, if any, to be provided by the second device, and
form and content of second reference data, if any, pertaining to the second device and which is to be provided by the second trusted device, a referral method definition pertaining to at least one referral method to be used by the devices for processing respective input data and reference data, b) the second device receiving an invitation message comprising information indicating the selected policy, c) the second device accessing the selected policy to obtain the roles definition and the referral method definition, d) the second device processing the second input data according to the referral method to form a second representative value, and the first device processing the first input data according to the referral method to form a first representative value, e) the first trusted device receiving, from the first device, the first representative value, and the second trusted device receiving, from the second device, the second representative value, f) the first trusted device confirming the originality of the first device, processing a first reference information according to the referral method, validating that the first input data is according to the policy and including the first representative value to form a first referenced representative value, g) the second trusted device processing a second reference information according to the referral method, and including the second representative value to form a second referenced representative value, h) the third trusted device receiving the first referenced representative value from the first trusted device, and the second referenced representative value from the second trusted device, i) the third trusted device validating first and second referenced representative value against the policy, j) the first trusted device and the second trusted device receiving, from the third trusted device, a transaction receipt comprising the first and second referenced representative value, k) the first trusted device validating the second referenced representative value in the received transaction receipt against the second role definition, and the second trusted device validating the first referenced representative value in the received transaction receipt against the first role definition.

2. The method of claim 1, wherein at least one of the first role definition and the second role definition comprises a device enumeration restriction specification specifying a minimum and/or maximum number of devices allowed for a role definition during a specific transaction.

3. The method of claim 1, wherein at least one of the first role definition and the second role definition further comprises at least one input data restriction specifying a set of allowed options for the input data specified in at least one of the first role definition and the second role definition.

4. The method of claim 1, wherein at least one of the first role definition and the second role definition further comprises at least one reference data restriction specifying a set of allowed options for the reference data specified in at least one of the first role definition and the second role definition.

5. The method of claim 3, wherein the at least one input data restriction specifies a set of allowed options for any device acting in any role defined in the role definition.

6. The method of claim 3, wherein the at least one input data restriction specifies a set of allowed options for any device acting in a specified role defined in the role definition.

7. The method of claim 3, wherein the at least one input data restriction specifies a set of allowed options for a specified device acting in a specified role defined in the role definition.

8. The method of claim 1, further comprising defining a first role and a second role, wherein the second role is defined by a reference to the first role, such that the second role inherits at least part of a definition of the first role.

9. The method of claim 1, wherein the policy further comprises a restriction regarding a communications technology to be used for transferring data during the transaction.

10. The method according to claim 1, wherein the policy further comprises a specification of which roles or devices may receive the receipt message of the transaction.

11. The method according to claim 1, wherein the policy further comprises information pertaining to the ability for a device in a role to delegate its participation in the transaction.

12. The method of claim 4, wherein the at least one reference data restriction specifies a set of avowed options for any device acting in any role defined in the role definition.

13. The method of claim 4, where the at least one reference data restriction specifies a set of allowed options for any device acting in a specified role defined in the role definition.

14. The method of claim 4, wherein the at least one reference data restriction specifies a set of allowed options for a specified device acting in a specified role defined In the role definition.

15. The method of claim 2, further comprising defining a first role and a second role, wherein the second role is defined by a reference to the first role, such that the second role inherits at least part of a definition of the first role.

16. The method of claim 2, wherein the policy further comprises a restriction regarding a communications technology to be used for transferring data during the transaction.

17. The method according to claim 2, wherein the policy further comprises a specification of which roles or devices may receive the receipt message of the transaction.

18. The method according to claim 2, wherein the policy further comprises information pertaining to the ability for a device in a role to delegate its participation in the transaction.

\* \* \* \* \*